US006806683B2

(12) United States Patent
Saldana et al.

(10) Patent No.: US 6,806,683 B2
(45) Date of Patent: Oct. 19, 2004

(54) BATTERY ADAPTER FOR NIGHT VISION DEVICE

(75) Inventors: Michael R. Saldana, New Braunfels, TX (US); David W. Buck, Mesquite, TX (US); Kenneth W. Sauter, Garland, TX (US)

(73) Assignee: Litton Systems, Inc., Los Angeles, CA (US)

( * ) Notice: Subject to any disclaimer, the term of this patent is extended or adjusted under 35 U.S.C. 154(b) by 32 days.

(21) Appl. No.: 10/248,631

(22) Filed: Feb. 2, 2003

(65) Prior Publication Data

US 2003/0169607 A1 Sep. 11, 2003

Related U.S. Application Data

(60) Provisional application No. 60/355,634, filed on Feb. 5, 2002.

(51) Int. Cl.[7] .................................................. H02J 7/00
(52) U.S. Cl. ...................................... 320/110; 320/107
(58) Field of Search ................................ 320/110, 107; 429/96, 97, 98, 99, 100, 121, 123; 350/214 VT, 330

(56) References Cited

U.S. PATENT DOCUMENTS

| 4,953,963 A | 9/1990 | Miller ......................... 350/547 |
| 5,121,045 A | 6/1992 | Caserta et al. ................. 320/13 |
| 5,130,527 A | 7/1992 | Gramer et al. ......... 250/213 VT |
| 5,703,354 A | * 12/1997 | Wannagot et al. ..... 250/214 VT |
| 6,087,660 A | 7/2000 | Morris et al. ............... 250/330 |
| 6,194,097 B1 | 2/2001 | Nelson et al. .............. 429/121 |

OTHER PUBLICATIONS

Chen, Stanley "Tiny Step–Up DC/DC Converter Design for Portal Single Cell Applications" at http://www.metatech.com.hk/appnote/aic/pdf/AN00–SR01EM–1638.pdf Mar. 2000.

Crowne, Rowan, "DC–DC converter to step up input voltage" at http://www.rowan.sensation.net.au/electronics/step-up.html Feb. 2000.

* cited by examiner

Primary Examiner—Lawrence Luk
(74) Attorney, Agent, or Firm—Marsteller & Associates, P.C.

(57) ABSTRACT

A battery adapter (A) replaces two batteries (10) with a single battery (10) housed within a compartment (48) of a battery powered electrical device (D). An electrically conductive housing (40) adapted to replicate a selected battery and fit within a space adapted to house two of the selected sized batteries. A step up circuit (18) mounted within the battery housing (40) receives an electrical signal from a single battery (10) and transforms the voltage of the electrical signal to simulate an electrical signal from two electrically connected selected batteries (10).

21 Claims, 6 Drawing Sheets

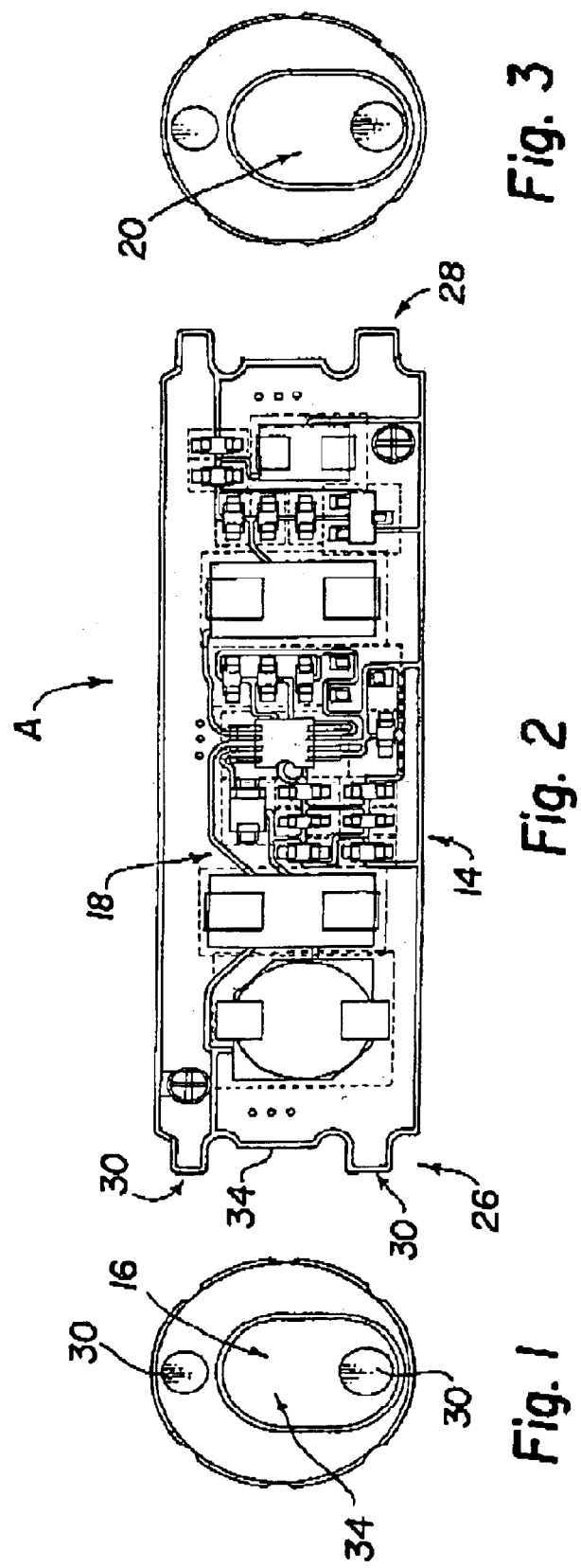

BATTERY ADAPTER FOR NIGHT VISION DEVICE

CROSS REFERENCE TO RELATED APPLICATIONS

This application claims the benefit of U.S. Provisional Application Serial No. 60/355,634, filed Feb. 5, 2002, entitled BATTERY ADAPTER FOR NIGHT VISION DEVICE.

BACKGROUND OF THE INVENTION

1. Technical Field

The invention relates to the field of power supplies for image viewing devices, and more particularly to an improved battery housing with an internal power converter.

2. Background Art

Image viewing devices, such as image intensifier or thermal imaging night vision goggles, are used generally by members of the military as well as others for detecting or sensing images of a scene. Such image viewers typically require a power source to provide power for the included electrical circuitry.

The present invention reduces the number of batteries, from two to one, required to operate a night vision system or other battery powered electrical devices that uses 2 known AA sized batteries. Most missions, that use night vision systems, are less than twenty-four hours in duration and do not require the full potential life of the batteries installed in the systems. After the mission the batteries are discarded. This practice will dispose of batteries that were not operated to the battery's end of life. By using this invention and only one battery in the night vision system, that battery will be more totally consumed and nearer to end of life at the end of the mission. This means that only one battery near end of life was discarded and not two; which reduces waste and cost.

The present invention consists of a main body that is placed inside the battery compartment of the night vision system that normally uses two batteries. The main body will occupy the space of one of the two batteries.

The main body contains electronic circuitry with terminals that connect a single battery to the electronic circuitry and the electronic circuitry to the night vision system. The electronic circuitry converts a single battery input voltage to a level that will operate the night vision system.

The old method was to use two batteries for all missions. Most missions require less than twenty-four hours of operation from the night vision system. The batteries are always discarded after every mission. This prevents installing batteries of unknown life expectancies in a night vision system for the next mission.

The disadvantage of the old method is wasting battery life, which could be as much as twice that provided by use of this invention.

Night vision systems are currently available and have been used by the US military and others that require only one battery. These systems use the voltage from one battery and produce an output voltage that will operate the night vision system. An example of such a system is U.S. Pat. No. 5,130,527, issued Jul. 14, 1992.

While the above-cited references introduce and disclose a number of noteworthy advances and technological improvements within the art, none completely fulfills the specific objectives achieved by this invention.

SUMMARY OF THE INVENTION

In accordance with the present invention, a battery adapter device for replacing two AA sized batteries with a single AA battery in a battery powered electrical device includes a single AA battery housing that is adapted to secure a single AA sized battery. The single battery housing fits within a space that is adapted to house two AA batteries electrically connected to the electrical device. A step-up circuit is mounted within the battery housing for receiving the electrical signal from the single AA battery that is contained within the housing. The step-up circuit transforms or converts the voltage of the electrical signal to simulate an electrical signal from two AA batteries that are electrically connected in series.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawing and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

FIG. 1 is a side view of a battery terminal on a printed circuit board of the present battery adapter.

FIG. 2 is a top plan view of a printed circuit board having the step-up circuitry.

FIG. 3 is a side view of a battery terminal on a printed circuit board for a known electrical device such as a night vision device.

DETAILED DESCRIPTION

So that the manner in which the above recited features, advantages and objects of the present invention are attained can be understood in detail, more particular description of the invention, briefly summarized above, may be had by reference to the embodiment thereof that is illustrated in the appended drawings. In all the drawings, identical numbers represent the same elements.

Figure 5:
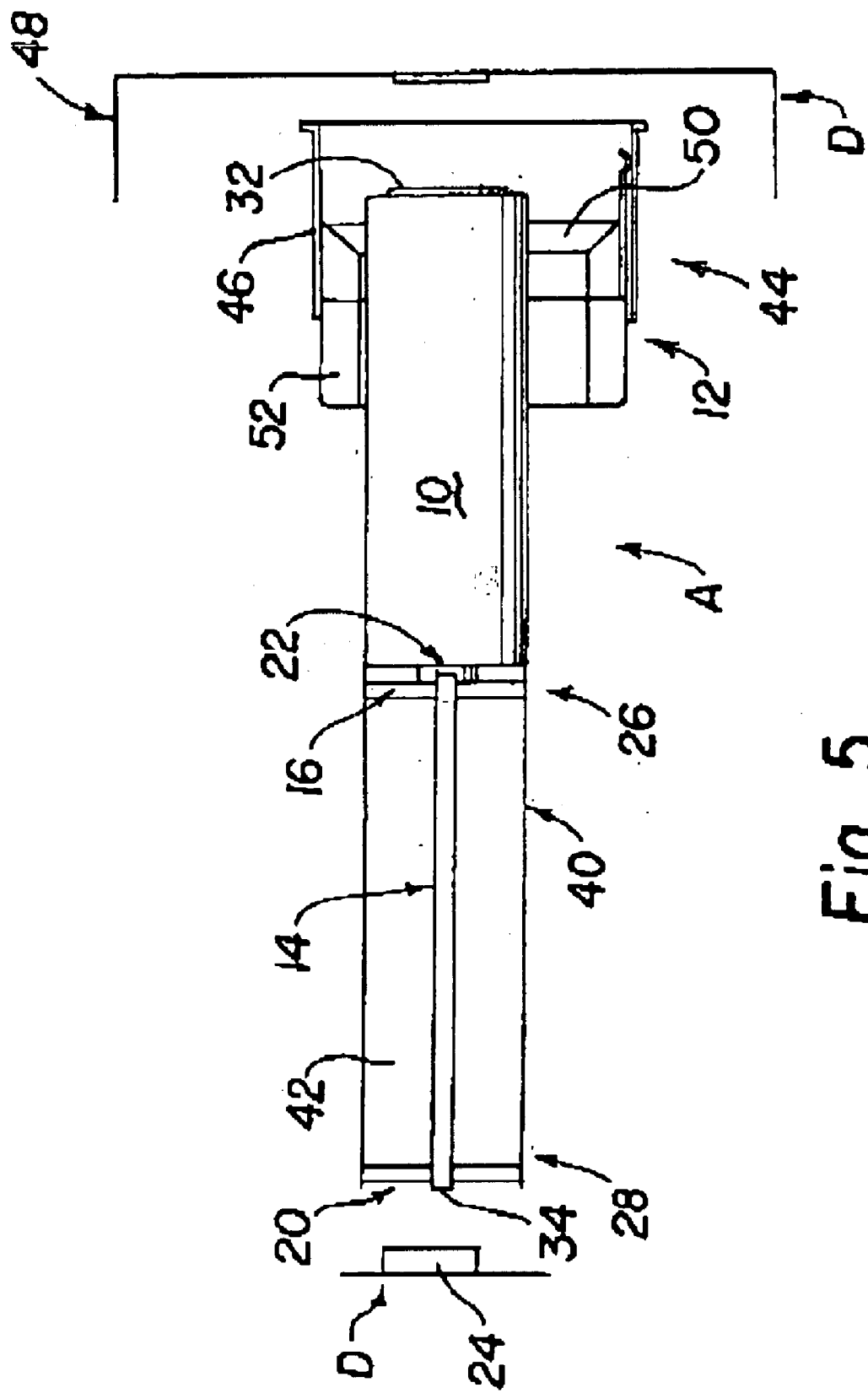
FIG. 5 is a longitudinal cross section of the present battery adapter.

A battery adapter device A replaces two known sized batteries 10, such as an AA cell of either voltage 1.5VDC or 3.6VDC, with a single battery 10 of the selected size in a battery powered electrical device D, such as a known night vision device of the type that includes image intensification or thermal imaging, which is partially shown in FIG. 5. The present battery adapter A includes a single AA battery housing 12 that is adapted to secure a single AA sized battery 10. The single battery housing 12 fits within a space that is adapted to house two AA batteries electrically connected to the electrical device D. A step-up circuit 14 is mounted within the battery housing 12 for receiving an electrical signal from the single AA battery 10 that is contained within the housing 12. The step-up circuit 14 transforms or converts the voltage of the electrical signal to simulate an electrical signal from two AA batteries 10 that are electrically connected in series.

FIG. 2 is one embodiment of the electronic circuitry 14 on 0.060 inch thick rigid printed circuit material. There are three printed circuits to this assembly: a first battery terminal 16 (FIG. 1), active circuitry 18 (depicted in FIG. 2), and a second output voltage terminal 20 (FIG. 3) that may be connected to the battery using device D.

The first battery terminal 16 is adapted to abut against a selected terminal 22 of battery 10 and maintain electrical connectivity with the battery 10 in order to pass the electrical signal.

Similarly the second terminal 20 is adapted to form an electrical connection with a power terminal 24 of the battery powered electrical device D.

The circuit 18 depicted in FIG. 2 receives the battery voltage input, at the left end of FIG. 2 (labeled as element 26), and produce an output voltage that will operate the desired battery using device D, such as a night vision system, at the right end of FIG. 2 (labeled as element 28). The circuit 18 will preferably sense the battery voltage for a near end of life level. At this level the circuit 18 will reduce the output voltage to the night vision system D, so that the system D can report a "low battery" condition. The tabs 30 on end 26 of the center printed circuit board ("PCB") 14 in FIG. 2 are also used to prevent the negative battery terminal 32 from touching the positive PCB terminal 34. This provides "reverse battery" protection.

Figure 4A:
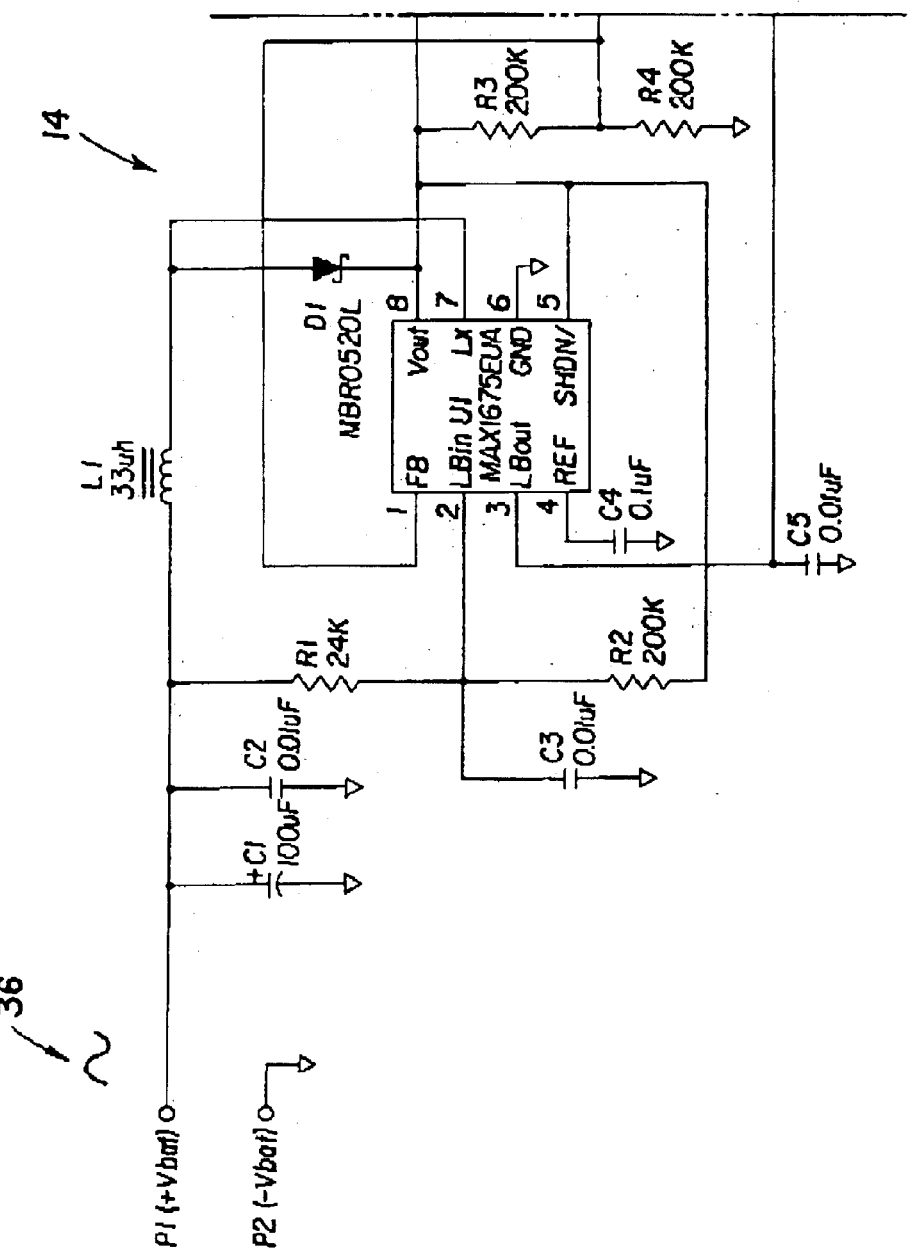
FIG. 4a and 4b are is a schematic diagram of the step-up circuit of the present invention.
Figure 4B:
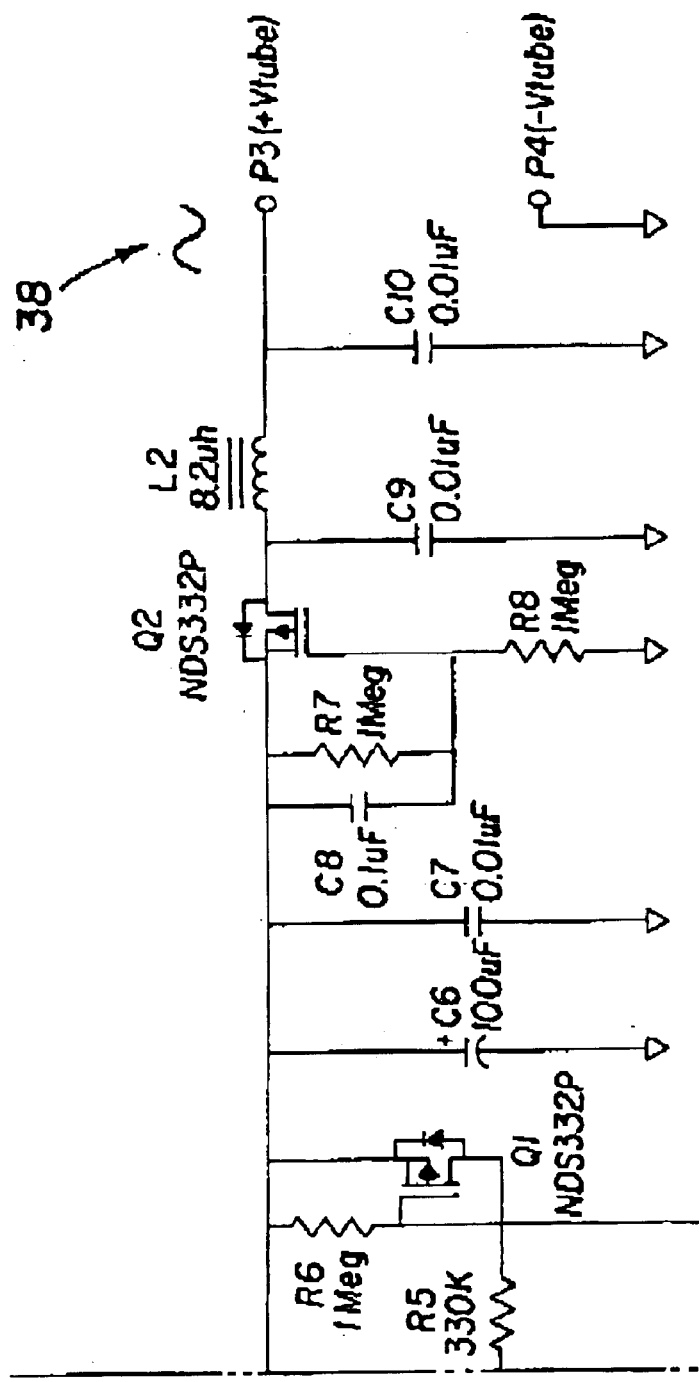

One embodiment of a schematic of the circuit 14 is shown in FIG. 4. An alternative embodiment of the schematic of the circuit 14 with an optional double voltage switch circuit unit to detect the alternative voltage for same sized batteries is shown in FIG. 6.

Figure 6A:
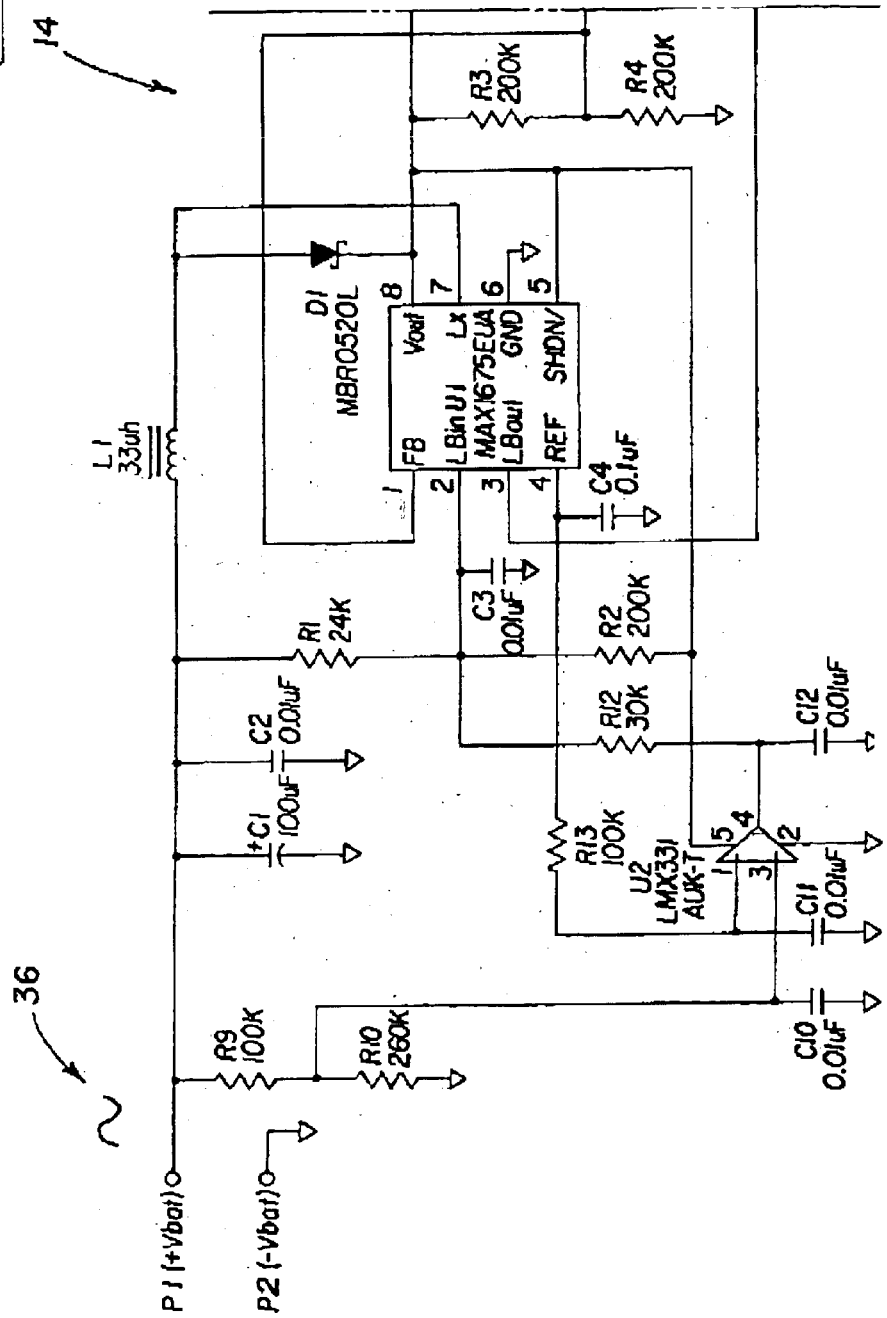
FIG. 6a and 6b are is an alternative schematic diagram of the step-up circuit to sense different voltage versions of same sized replaceable batteries.
Figure 6B:
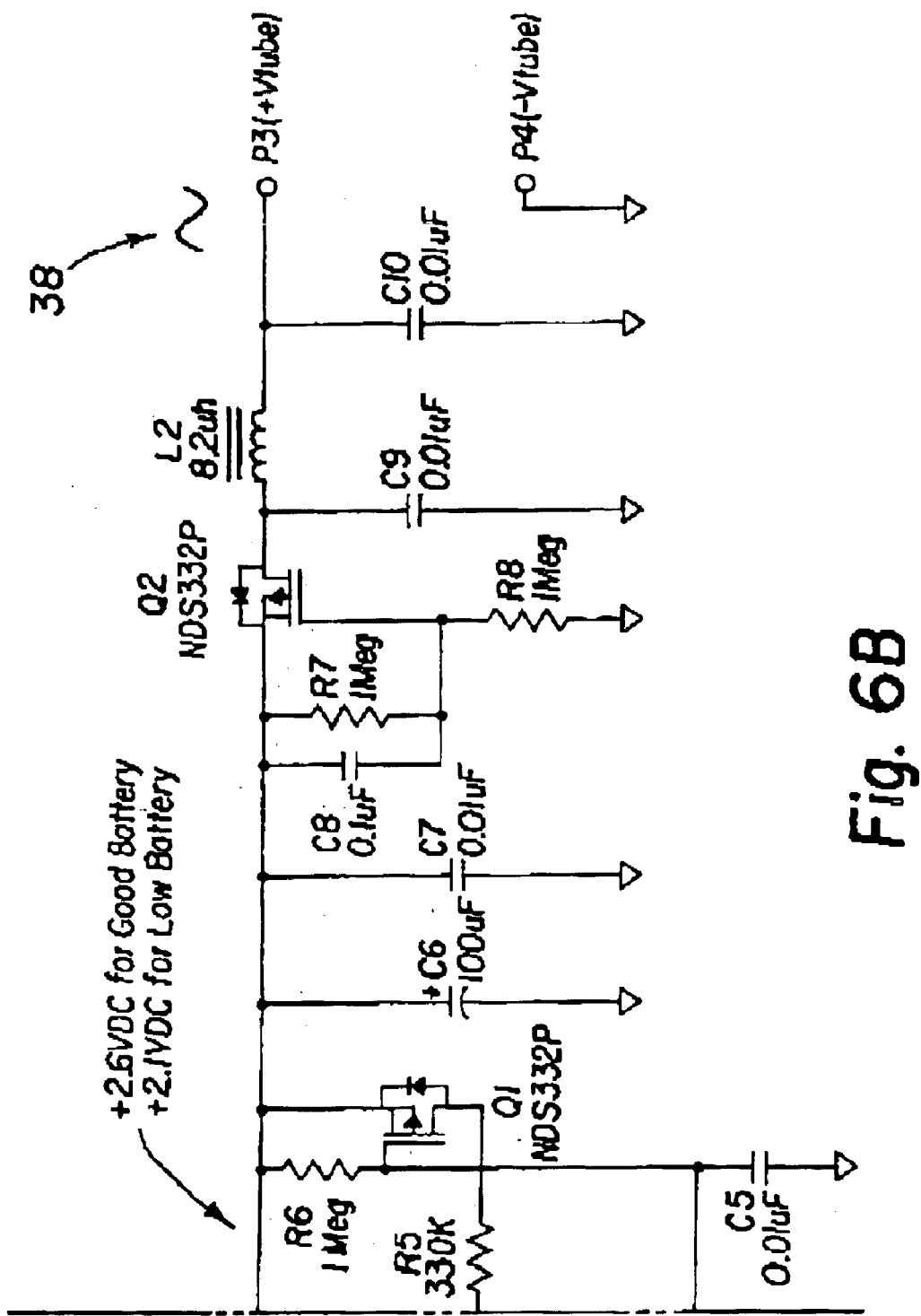

Referring particularly to FIG. 6, the circuit 14 receives the voltage signal 36 from the single AA battery of 1.5VDC or 3.6VDC at terminals P1 and P2 in FIG. 4. It converts the input voltage to a regulated output voltage signal 38 at P3 that will operate the Night Vision system or other desired device D without causing the system to report a "low battery" condition due merely to replacing two batteries connected in series by the single battery 10.

The circuit 14 also senses the battery voltage through resistors R9 and R10 into connection pin 1 of integrated circuit U2. With a single battery 10 type producing 1.5VDC the connection pin 4 of integrated circuit U2 will be high while the battery voltage is below 1.8VDC, which is a voltage threshold that is selected to be between the highest fully charged 1.5VDC battery 10 and the lowest operating voltage of the 3.6VDC battery 10 types.

When replaceable battery 10 is a single 3.6VDC type the connection pin 4 of integrated circuit U2 will be low which will pull the resistor R12 to ground potential with the other end of R12 connected to the node of resistors R1 and R2 which then changing the threshold bias voltage into connection pin 2 (LBin) of integrated circuit U1 from a battery 10 sense of 1.1VDC "low battery" threshold to a 2.2VDC "low battery" threshold.

Connection pin 3 (LBout) of integrated U1 will be high while the battery 10 voltage is above the "low battery" threshold. Once the battery 10 is at or below the desired "low battery" threshold the output at connection pin 3 will go low level. This causes transistor Q1 to turn on, pulling the voltage across resistor R5 high and then changing the output voltage 38 to a lower output level that will cause the Night Vision system D having known battery condition sensing abilities to report a "low battery" condition.

Transistor Q2 functions as a load D delay switch so that integrated circuit U1 can establish full output voltage 38 before the load D is connected through transistor Q2.

The battery step-up circuit 14 of FIG. 4 differs from that depicted in FIG. 6 by eliminating the double voltage battery switch circuit segment that acts to increase the trip point of the "low battery" voltage threshold to be higher for a 3.6 volt AA sized battery. All other circuit functions remain the same between FIGS. 4 and 6, except that circuit 14 of FIG. 4 would not report a "low battery" condition for a 3.6VDC battery 10.

An example of the integrated circuits U1 and U2 that may be used are numbers MAX1675 and LMX331 manufactured by MAXIM Integrated Products, Inc. of 120 San Gabriel Dr. Sunnyvale Calif. 94086 USA. Also, an example of the transistors Q1 and Q2 that may be used are number NDS332P manufactured by Fairchild Semiconductor Corp. of 82 Running Hill Rd. South Portland, Me. 04106 USA.

FIG. 5 shows a cross-section of PCB 18, an electrically conductive tube 40 that acts to house the PCB 18 in its interior 42, and the return interface connection 44. A single battery has been inserted from the right of FIG. 5, as is shown. Preferably, the conductive tube 40 is constructed to simulate the size and shape of the type of battery that the present invention replaces.

One embodiment of the present invention consists of the three PCB's 14, 16, and 20, the tube body 40, and a locking negative return assembly 46. The Tube Body extends from PCB 20 and terminates in the locking negative return assembly 46. The tube body 40 is electrically attached to the three PCB's 14, 16, and 20 and the Locking negative return assembly 46. The locking negative return assembly 46 removably holds the entire assembly in the battery compartment 48 of the Night Vision system or other device D. This permits easy removal of the battery 10 unit while keeping the present invention A locked in the Night Vision system's battery compartment 48. The present invention A can be removed from the battery compartment 48 by simply pulling on the locking negative return assembly 46.

The locking negative return assembly may include a collar 50 and jacket 52 that are adapted to be received in the battery compartment 48.

There are other system types with different double battery arrangements that can benefit from the present invention. Such other embodiments require modifications to the above embodiment, but the overall components remain the same.

The present invention permits any two battery requiring Night Vision or other system to use only one battery during normal length mission and can optionally use the standard two batteries during extended missions. The present invention reduces battery usage and waste.

There are two different and known basic double battery configurations generally used in electrical devices: inline and side-by-side, for example. There can be spacing and mounting variations of these two basic configurations.

Other known types of batteries may be used in the present battery adapter when the battery adapter is adapted to receive such batteries instead of the AA size cell described above and the power step-up circuit is modified to double the standard voltage of the single selected size or type of battery.

The foregoing disclosure and description of the invention are illustrative and explanatory thereof, and various changes in the size, shape and materials, as well as in the details of the illustrated construction may be made without departing from the spirit of the invention.

What is claimed is:

1. A battery adapter device for replacing two known batteries with a single battery in a battery powered electrical device comprising:
    a single battery housing adapted to secure a single selected size battery and fit within a space adapted to house two of the selected sized batteries electrically connected to the electrical device; and,
    a step up circuit mounted within the battery housing for receiving an electrical signal from the single selected battery mounted within the housing and transforming an output voltage of the electrical signal for an output signal to simulate an electrical signal from two electrically connected selected batteries.

2. The invention of claim 1 wherein the selected size of battery is an AA battery.

3. The invention of claim 1 wherein the output electrical signal of the electrically connected selected battery simulates two selected batteries electrically connected in series.

4. The invention of claim 1 wherein the step up circuit is mounted within an electrically conductive housing simulating the shape of the selected sized battery.

5. The invention of claim 1 wherein the step up circuit further transforms the output signal to create a "low battery" condition signal.

6. The invention of claim 5 wherein the step up circuit further includes a double voltage battery switch circuit segment for selecting the trip point of the "low battery" circuit segment.

7. The invention of claim 1 wherein the step up circuit further includes a load delay switch circuit portion.

8. A viewing device comprising:
    a battery powered night vision device of the type including image intensification or thermal imaging;
    a battery adapter device for replacing two known batteries with a single battery in a battery powered electrical device; the battery adapter comprising:
        a single battery housing adapted to secure a single selected sized battery and fit within a space adapted to house two of the selected sized batteries electrically connected to the electrical device; and,
        a step up circuit mounted within the battery housing for receiving an electrical signal from the single selected battery mounted within the housing and transforming an output voltage of the electrical signal for an output signal to simulate an electrical signal from two electrically connected selected batteries.

9. The invention of claim 8 wherein the selected size of battery is an AA battery.

10. The invention of claim 8 wherein the output electrical signal of the electrically connected selected battery simulates two selected batteries electrically connected in series.

11. The invention of claim 8 wherein the step up circuit is mounted within a electrically conductive housing simulating the shape of the selected size battery.

12. The invention of claim 8 wherein the step up circuit further transforms the output signal to create a "low battery" condition signal.

13. The invention of claim 12 wherein the step up circuit further includes a double voltage battery switch circuit segment for selecting the trip point of the "low battery" circuit segment.

14. The invention of claim 8 wherein the step up circuit further includes a load delay switch circuit portion.

15. A replaceable voltage supply assembly for a viewing device of the type including image intensification or thermal imaging comprising:
    a changeable single battery unit means for generating a first voltage;
    a battery adapter device for replacing two known batteries with a single battery in a battery powered electrical device; the battery adapter comprising:
        a single battery housing adapted to secure a single selected sized battery and fit within a space adapted to house two of the selected sized batteries electrically connected to the electrical device; and,
        a step up circuit mounted within the battery housing for receiving an electrical signal from the single selected battery mounted within the housing and transforming an output voltage of the electrical signal for an output signal to simulate an electrical signal from two electrically connected selected batteries.

16. The replaceable voltage supply assembly of claim 15 wherein the selected size of battery is an AA battery.

17. The replaceable voltage supply assembly of claim 15 wherein the output electrical signal of the electrically connected selected battery simulates two selected batteries electrically connected in series.

18. The replaceable voltage supply assembly of claim 15 wherein the step up circuit is mounted within an electrically conductive housing simulating the shape of the selected sized battery.

19. The replaceable voltage supply assembly of claim 15 wherein the step up circuit further transforms the output signal to create a "low battery" condition signal.

20. The replaceable voltage supply assembly of claim 19 wherein the step up circuit further includes a double voltage battery switch circuit segment for selecting the trip point of the "low battery" circuit segment.

21. The replaceable voltage supply assembly of claim 15 wherein the step up circuit further includes a load delay switch circuit portion.

\* \* \* \* \*